(12) United States Patent
Inkpen et al.

(10) Patent No.: US 11,735,778 B2
(45) Date of Patent: Aug. 22, 2023

(54) BATTERY PACK DEVICE WITH CASINGS FOR MULTIPLE CELLS

(71) Applicants: Honeywell Limited, Mississauga (CA); Instrumar Limited, St. John's (CA)

(72) Inventors: Stuart Inkpen, St. John's (CA); Joshua Swamidas, St. John's (CA); Bill Conway, St. John's (CA); Dana Linfield, St. John's (CA); Ruth Abraham, St. John's (CA); Carl Weisser, Aurora (CA); Vic Weglarz, Burlington (CA)

(73) Assignees: Honeywell Limited, Mississauga (CA); AeroELT, LLC, Miami, FL (US)

( * ) Notice: Subject to any disclaimer, the term of this patent is extended or adjusted under 35 U.S.C. 154(b) by 815 days.

(21) Appl. No.: 15/707,779

(22) Filed: Sep. 18, 2017

(65) Prior Publication Data
US 2018/0083241 A1   Mar. 22, 2018

Related U.S. Application Data

(60) Provisional application No. 62/397,326, filed on Sep. 20, 2016.

(51) Int. Cl.
*H01M 10/42*   (2006.01)
*H01M 50/24*   (2021.01)
(Continued)

(52) U.S. Cl.
CPC ..... *H01M 10/4207* (2013.01); *H01M 10/425* (2013.01); *H01M 50/107* (2021.01);
(Continued)

(58) Field of Classification Search
CPC ........... H01M 10/4207; H01M 10/425; H01M 50/107; H01M 50/213; H01M 50/222;
(Continued)

(56) References Cited

U.S. PATENT DOCUMENTS

2007/0201192 A1* 8/2007 McGuire ................. G01L 19/14
361/600
2007/0223317 A1   9/2007 Sun
(Continued)

FOREIGN PATENT DOCUMENTS

CN   201017931 Y   2/2008
CN   101268569 A   9/2008
(Continued)

OTHER PUBLICATIONS

First Office Action and Search Report, and translation thereof, from counterpart Chinese Application No. 201710850797.8, dated Aug. 23, 2021, 23 pp.
(Continued)

*Primary Examiner* — Adam A Arciero
(74) *Attorney, Agent, or Firm* — Shumaker & Sieffert, P.A.

(57) ABSTRACT

In some examples, a high-energy-density battery pack device includes a circuit board and at least two casing structures mounted on the circuit board. In some examples, the high-energy-density battery pack device also includes at least two cells electrically connected in series or in parallel through the circuit board. In some examples, each cell of the at least two cells is positioned in a casing structure of the at least two casing structures. In some examples, the respective casing structure surrounds the respective cell with an opening on one end of the cell.

12 Claims, 10 Drawing Sheets

(51) Int. Cl.
*H01M 50/249* (2021.01)
*H01M 50/284* (2021.01)
*H01M 50/213* (2021.01)
*H01M 50/222* (2021.01)
*H01M 50/224* (2021.01)
*H01M 50/107* (2021.01)
*H01M 50/548* (2021.01)

(52) U.S. Cl.
CPC ....... *H01M 50/213* (2021.01); *H01M 50/222* (2021.01); *H01M 50/224* (2021.01); *H01M 50/24* (2021.01); *H01M 50/249* (2021.01); *H01M 50/284* (2021.01); *H01M 50/548* (2021.01); *H01M 2200/00* (2013.01); *H01M 2220/20* (2013.01)

(58) Field of Classification Search
CPC ............. H01M 50/224; H01M 50/249; H01M 50/284; H01M 50/548
See application file for complete search history.

(56) References Cited

U.S. PATENT DOCUMENTS

| | | | |
|---|---|---|---|
| 2012/0156525 A1 | 6/2012 | Hong | |
| 2012/0308849 A1* | 12/2012 | Tortstensson | H01M 2/1072 429/7 |
| 2013/0224524 A1 | 8/2013 | Nam et al. | |
| 2013/0224574 A1 | 8/2013 | Favaretto | |
| 2015/0303527 A1 | 10/2015 | Maxwell | |
| 2016/0218336 A1* | 7/2016 | Herrmann | H01M 2/1252 |
| 2017/0025657 A1 | 1/2017 | Reinshagen et al. | |
| 2018/0040862 A1* | 2/2018 | Yi | H01M 2/1077 |

FOREIGN PATENT DOCUMENTS

| | | |
|---|---|---|
| CN | 105702894 A | 6/2016 |
| JP | 2000058018 A | 2/2000 |
| JP | 2005100841 A | 4/2005 |
| WO | 2015154910 A1 | 10/2015 |

OTHER PUBLICATIONS

Response to Extended Search Report dated Apr. 4, 2019, from counterpart European Application No. 17191921.0, filed May 15, 2019, 9 pp.
Response to Extended European Search Report dated Dec. 18, 2017, from counterpart European Application No. 17191921.0, filed on Mar. 30, 2018, 16 pp.
"Minimum Operational Performance Standards (MOPS) for Lithium Batteries," RTCA, Inc., RTCA DO-227, Jun. 23, 1995, 91 pp.
"SM74611 Smart Bypass Diode," Texas Instruments, Dec. 2012, Revised May 2016, 18 pp.
"Model ADT 406 S," Emergency Locator Transmitter, accessed on Sep. 13, 2017 from www.elta.fr, 2 pp.
"LM 17500 Primary Li-MnO$_2$ cell," SAFT, accessed on Sep. 13, 2017 from www.saftbatteries.com, 2 pp.
Examination Report from counterpart European Application No. 17191921.0, dated Apr. 4, 2019, 4 pp.
Notice of Intent to Grant from counterpart Chinese Application No. 201710850797.8 dated Apr. 19, 2022, and translation thereof, 5 pp.
Extended European Search Report from counterpart European Application No. 17191921.0, dated Dec. 18, 2017, 8 pp.
Notice of Intent to Grant and Text Intended to Grant from counterpart European Application No. 17191921.0, dated Jul. 24, 2019, 43 pp.

* cited by examiner

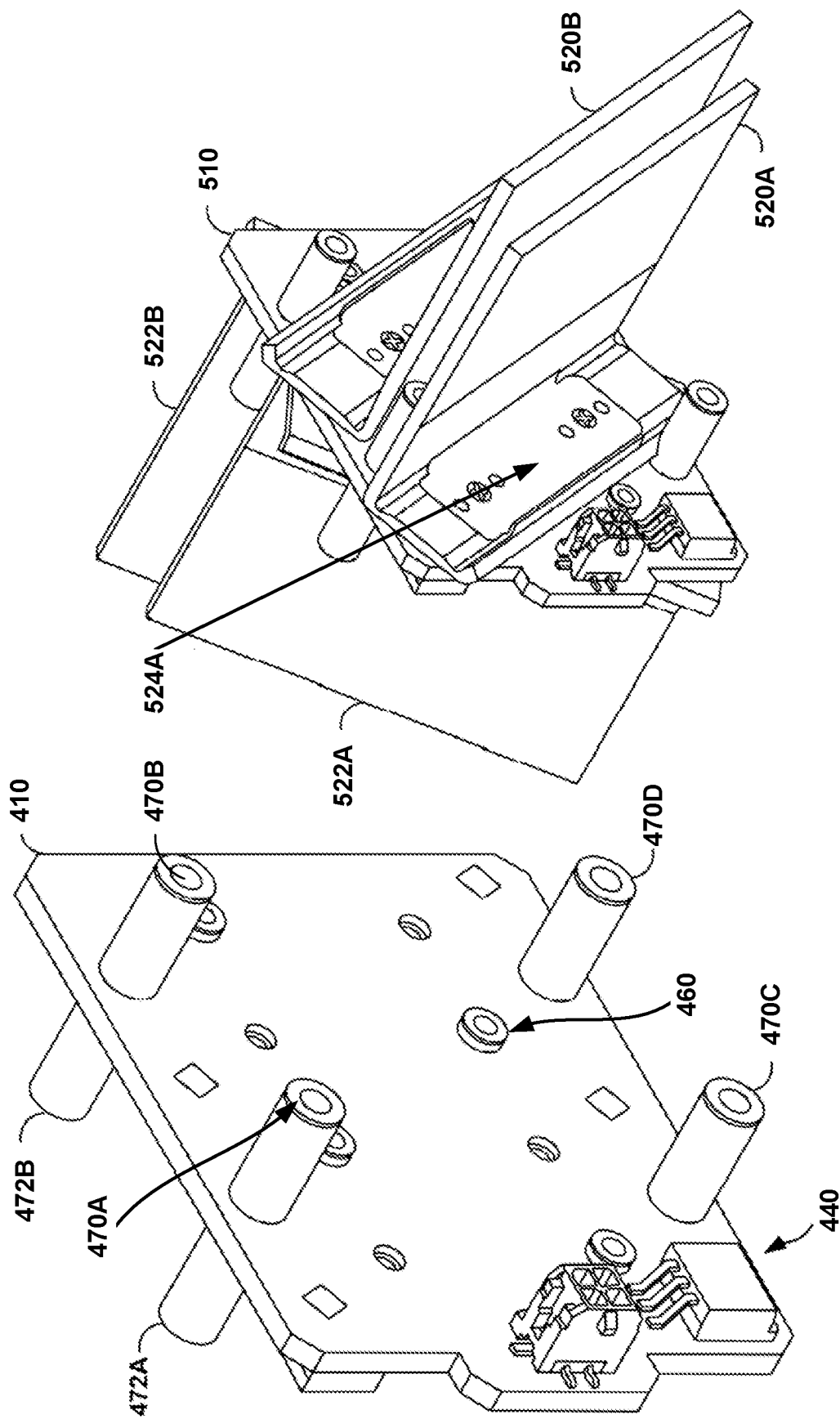

BATTERY PACK DEVICE WITH CASINGS FOR MULTIPLE CELLS

This application claims the benefit of U.S. Provisional Patent Application No. 62/397,326, filed Sep. 20, 2016.

TECHNICAL FIELD

This disclosure relates to high-energy-density battery packs.

BACKGROUND

In 2015, the Federal Aviation Administration (FAA) issued early drafts of new regulations around primary (non-rechargeable) lithium batteries. Typical uses for such batteries in aerospace include Emergency Locator Transmitters (ELTs), acoustic location pingers, flashlights, backup for avionics, etc. The concept behind the new regulations was that, for safe operation of a cell in aerospace applications, the consequences to the airframe and its occupants of the battery having a "spontaneous thermal event" should be benign.

SUMMARY

This disclosure is directed to systems, devices, and methods for a high-energy-density battery pack that includes a string of at least two cells electrically connected in series through a circuit board. The battery pack also includes at least two casing structures on each side of the circuit board, where each cell is positioned in a casing structure.

In one example, a high-energy-density battery pack device includes a circuit board and at least two casing structures mounted on the circuit board. In some examples, the high-energy-density battery pack device also includes at least two cells electrically connected in series or in parallel through the circuit board. In some examples, each cell of the at least two cells is positioned in a casing structure of the at least two casing structures. In some examples, the respective casing structure surrounds the respective cell with an opening on one end of the cell.

In another example, a device includes a high-energy-density battery pack that includes a circuit board and at least two casing structures mounted on the circuit board. The high-energy-density battery pack also includes at least two cells electrically connected in series or in parallel through the circuit board. Each cell of the at least two cells is positioned in a casing structure of the at least two casing structures. The respective casing structure surrounds the respective cell with an opening on one end of the cell. The device further includes a transmitter configured to receive electrical power from the at least two cells through the circuit board. The transmitter is also configured to transmit electromagnetic signals based on the electrical power.

Another example is directed to a method including forming a circuit board and mounting at least two casing structures on the circuit board. The method also includes installing each cell of at least two cells in a respective casing structure of the at least two casing structures, such that the at least two cells are electrically connected in series or in parallel through the circuit board. The respective casing structure surrounds the respective cell with an opening on one end of the cell.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a perspective-view diagram of a circuit board before mounting casing structures, in accordance with some examples of this disclosure.

FIG. 5 is a perspective-view diagram of a circuit board and casing structures before installing cells, in accordance with some examples of this disclosure.

DETAILED DESCRIPTION

Figure 1A:
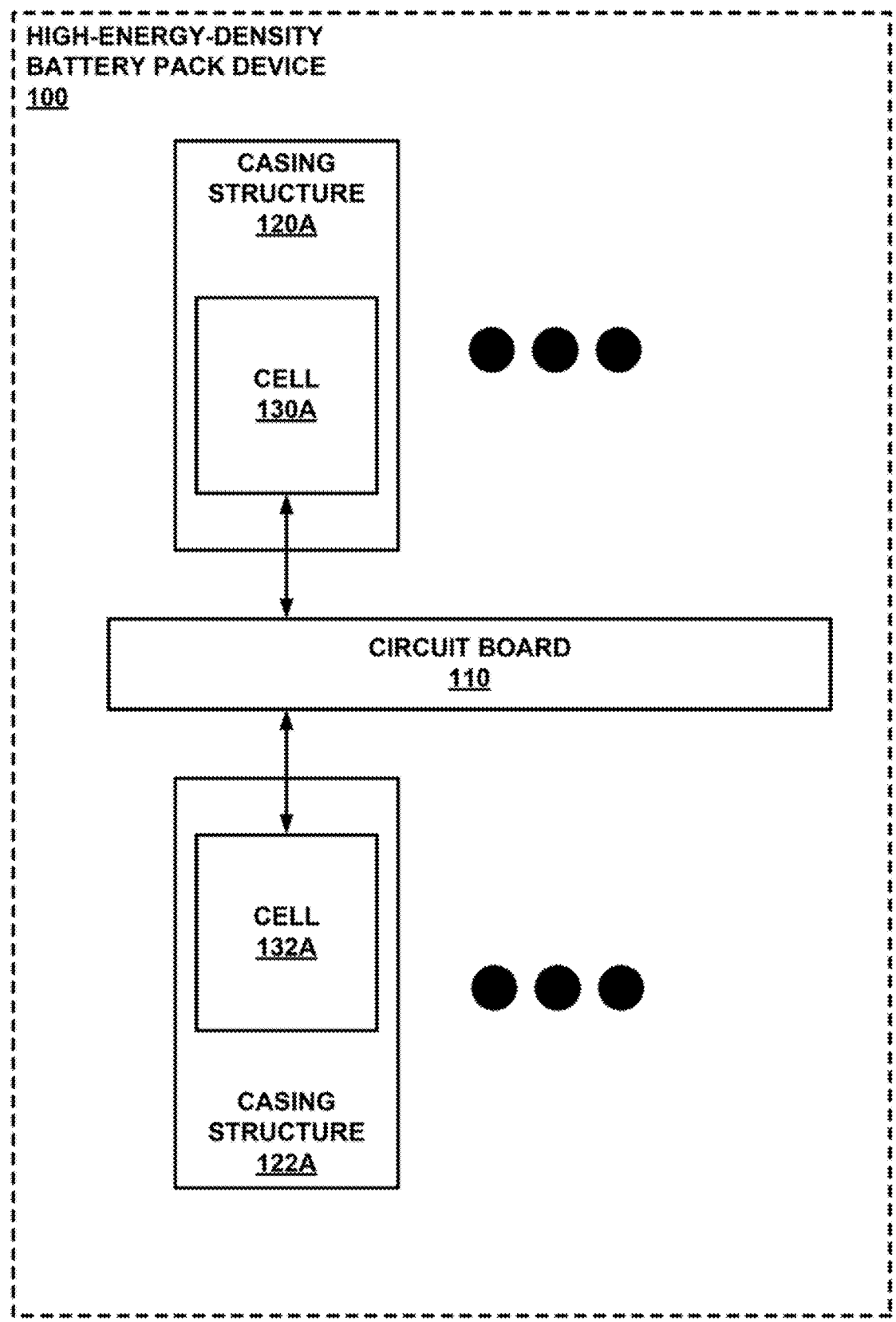
FIGS. 1A and 1B are conceptual block diagrams of a high-energy-density battery pack device including cells positioned in casing structures, in accordance with some examples of this disclosure.

Various examples are described below generally directed to devices, systems, and methods for a high-energy-density battery pack that is designed to reduce or eliminate the damage caused by a thermal event. A thermal event, also known as thermal runaway, occurs when a cell in the battery pack overheats and possibly explodes. In some sensitive applications, such as aviation, a thermal event may cause extensive damage to a larger system, such as an aircraft. The design of the battery pack may result in reduced damage from a thermal event by containing a cell explosion and reducing the likelihood that the thermal event spreads to a second cell in the battery pack.

A thermal event may be a very rare event for a given battery, but there are hundreds or thousands of batteries in a system such as a commercial aircraft. With thousands of aircraft in a fleet, thermal events may occur often enough to be a design consideration. For example, flashlights, backup batteries, defibrillations, sensors, and the like may include batteries. Many batteries are located in or near the cockpit of the aircraft. The techniques of this disclosure may also be useful for batteries in other systems, such as buildings, land vehicles, marine vehicles, spacecraft, and so on.

An alkaline battery or a lead-acid battery may be less susceptible to thermal events, as compared to high-energydensity batteries, but alkaline and lead-acid batteries have disadvantages relative to high-energy-density batteries, such as lithium-ion batteries, lithium-metal batteries, and nickel cadmium batteries. For example, an alkaline battery stores less energy per kilogram and has a higher leakage current than a high-energy-density battery. Therefore, replacing high-energy-density batteries with alkaline batteries would lead to much larger battery packs.

In addition, an alkaline battery may store less energy per volume and per kilogram, as compared to a high-energy-density battery. An alkaline battery may also have higher internal impedance than a high-energy-density battery, so the supply voltage of the alkaline battery declines as the supply current requirement increases. Moreover, an alkaline battery or a lead-acid battery may not operate properly in temperatures below negative one or two degrees Celsius, but certain high-energy-density battery chemistries may continue to operate at temperatures well below zero degrees Celsius. While high-energy-density batteries have numerous advantages, as compared to alkaline batteries, a high-energy-density cell may experience a thermal event that spreads to some or all of the high-energy-density cells in a battery pack. The design of the battery pack can influence the likelihood that a thermal event in a first cell spreads to the other cells in the battery pack.

For example, the thermal runaway of a lithium battery may have caused a fire onboard a parked Ethiopian Airlines aircraft in July 2013. The aircraft included an emergency locator transmitter (ELT) powered by lithium batteries. A thermal runaway in one of the lithium cells may have spread to other lithium cells in the ELT, leading to a fire in the cabin and the fuselage of the aircraft.

A thermal event may produce an extremely hot fire of twelve hundred degrees Celsius to fifteen hundred degrees Celsius. The melting point of lithium is approximately one-hundred-and-eighty-point-five degrees Celsius. If the thermal event in one lithium cell causes the temperature of another lithium cell to reach the melting temperature of lithium, the lithium in the other cell will melt and most likely cause that cell to experience a thermal event. The fire may burn off the electrolyte of the cell very quickly, and the lithium in the cell may continue to burn for twenty or thirty seconds. A stainless steel casing structure may also partially or fully melt during the thermal event. The molten metal of the cell may take longer than thirty seconds to cool down. A thermal event in a larger cell may last for a longer duration than a thermal event in a smaller cell.

To reduce or eliminate the damage caused by thermal events in high-energy-density batteries, such as lithium batteries, a battery pack may include a circuit board and casing structures to robustly hold and/or physically separate the cells. The casing structures may be configured to hold the cells even during a thermal event to prevent a cell from falling off the circuit board. The casing structures may include material with a high heat capacity to absorb the heat from the thermal event. The battery pack may orient the cells in different directions so that the heat and molten slag that result from a thermal event will travel in a direction away from the other cells that are not involved in the thermal event. As a result, the battery pack may have a reduced likelihood of a thermal event spreading from a first cell to any other cell. If a cell is attached to another cell without any barrier (e.g., a casing structure), a thermal event in one of the cells will spread to the other cell.

Thus, a device of this disclosure may withstand a thermal event in one cell without allowing the thermal event to spread to any other cell. In contrast, an existing battery pack with multiple cells will arrange the cells adjacent to each other without any barriers between the cells. The existing battery pack may not include a printed circuit board (PCB) as a barrier between cells. Instead, the existing battery pack will include wires to electrically connect the cells, and the wires may spread heat from one cell to other cells. Wires may not be necessary in a device of this disclosure because a circuit board facilitates the electrical connections between cells and other components and may eliminate any safety issue of pinching or damaging wires. The device may also have fewer manufacturing errors caused by assembling battery packs using multiple components with wires. An existing battery pack will not arrange the cells to point to different corners of the circuit board. When a thermal event occurs in one cell of an existing battery pack, the thermal event is more likely to spread to another cell, as compared to a battery pack of this disclosure.

Figure 1B:
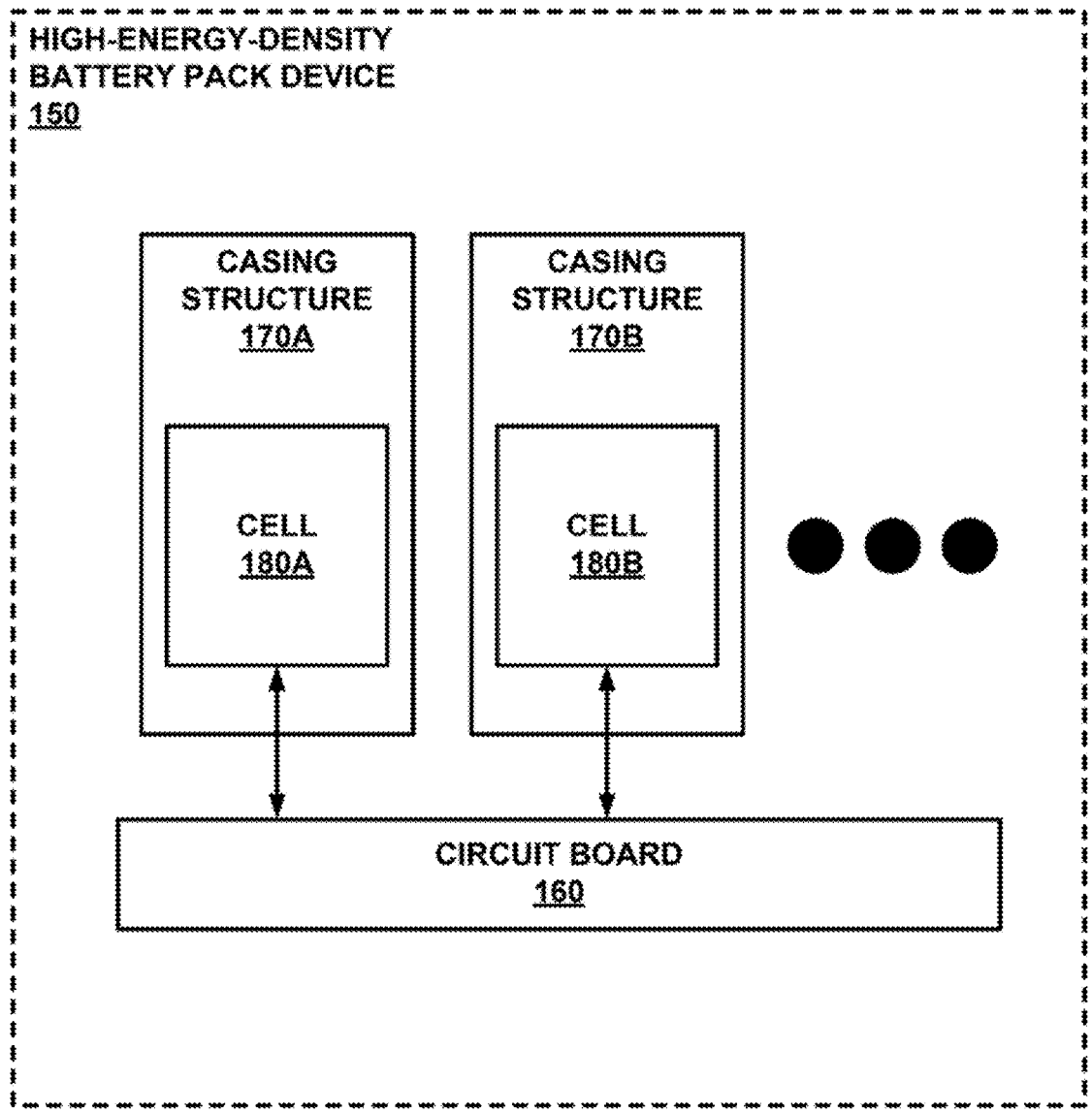

FIGS. 1A and 1B are conceptual block diagrams of high-energy-density battery pack devices 100 and 150 including cells 130A, 132A, 180A, and 180B positioned in casing structures 120A, 122A, 170A, and 170B, in accordance with some examples of this disclosure. Devices 100 and 150 also include circuit boards 110 and 160 to facilitate electrical connections between cells 130A and 132A and between cells 180A and 180B. Devices 100 and 150 may be referred to as a battery module or a battery pack.

Circuit board 110 may be configured to connect cells 130A and 132A in series or in parallel. Circuit board 160 may be configured to electrically connect cells 180A and 180B in series or in parallel. Circuit boards 110 and 160 may include insulating or semi-insulating materials, such as flame-resistant material (FR-4), epoxy resin, glass, silicon, and/or molding compound. Circuit boards 110 and 160 may also include conductive material such as copper, solder, aluminum, and/or gold.

Casing structures 120A and 122A are positioned on different sides (e.g., top and bottom in FIG. 1A) of circuit board 110, and casing structures 170A and 170B are positioned on a same side (e.g., top in FIG. 1) side of circuit board 160. The cells on the same side of a circuit board may be electrically connected in series as a string, or the string may include cells on different sides of the circuit board. In some examples, device 100 or 150 may include more than two casing structures and more than two cells each side of circuit board 110 or 160.

Each casing structure may be configured to hold a respective cell off the circuit board with an air gap or a gap filled by material. The gap between the cell and the circuit board may be filled with ceramic or foam material. The air, ceramic, or foam may provide an extra heat barrier between the cell and the circuit board. If the casing structure includes metal, the metal layer may turn to molten metal during a thermal event, absorbing thermal energy. The casing structure may also be configured to hold the cell in place during a thermal event to prevent the cell from falling off the circuit board, which may cause damage and increase the chances that the thermal event spreads to other cells.

Casing structures 120A, 122A, 170A, and 170B may include materials that are heat resistant, flame resistant, and/or able to absorb a large amount of heat. Casing structures 120A, 122A, 170A, and 170B may include metal such as stainless steel and/or a ceramic material. During a thermal event, a casing structure may absorb some or all of the heat of the thermal event. Thus, a casing structure may act as a heat sink and/or a barrier during a thermal event. Each of casing structures 120A, 122A, 170A, and 170B may surround a respective one of cells 130A, 132A, 180A, and 180B and include one or more openings. In some examples, each cell may include a vent that opens when pressure builds up from a thermal event before the entire cell bursts. The vent may be sealed during normal operation of the cell. During a thermal event, heat (e.g., flame, smoke and debris) released from a cell's vent point may travel out of the opening of the respective casing structure. The casing structure may be designed such that the opening points away from other high-energy-density cells so that a thermal event does not spread from one high-energy-density cell to other cells. Thus, a casing structure may also act as a funnel to push or direct heat in a less destructive direction.

One important feature of a high-energy-density battery pack device is the ability to function well when installed at different angles. This feature may be referred as orientation-agnostic. For example, if the device is designed at an angle so that the molten slag from a thermal event will drip off the device, the molten slag may drip in a different direction if the device is installed at a different angle. It may be advantageous to design a device to function well when installed right-side upside, upside-down, or at any other angle. In practice, the designers and manufacturers may have little or no control over the angle at which the device is installed. In contrast, a designer may control the relative angles between the cells but not the absolute angle of each cell. Without control over the direction of gravity relative to the cells, the designer cannot rely on gravity to direct heat away from the other cells.

Cells 130A, 132A, 180A, and 180B are positioned in casing structures 120A, 122A, 170A, and 170B. Each of casing structures 120A, 122A, 170A, and 170B may fully or partially enclose a respective one of cells 130A, 132A, 180A, and 180B. In some examples, each of casing structures 120A, 122A, 170A, and 170B may wrap around a respective one of cells 130A, 132A, 180A, and 180B to form a cylindrical shape or a rectangular box shape.

Cells 130A, 132A, 180A, and 180B may include lithium-ion cells, lithium-metal cells, lithium-polymer cells, and/or nickel cadmium cells. Cells 130A, 132A, 180A, and 180B may have "high energy density" when fully charged, compared to fully charged alkaline battery or a lead-acid battery. Cells 130A and 132A may be electrically connected in series as a string or in parallel or in a combination of series and parallel, through the conductive material in circuit board 110. In some examples, the cells on a first side of a circuit board may be electrically connected in series as a string that is electrically in parallel with a string of cells on a second side of circuit board 110 through the conductive material of circuit board 110. An electrical contact pad may be soldered or screwed onto circuit board 110 or a casing structure. A cell may be positioned on the electrical contact pad to create an electrical connection.

In accordance with the techniques of this disclosure, casing structures 120A, 122A, 170A, and 170B may thermally insulate each of cells 130A, 132A, 180A, and 180B from each other. During a thermal event for a first cell, the respective casing structure may absorb some or all of the heat from the thermal event to prevent the thermal event from spreading to a second cell. The respective casing structure may also impede the molten slag of the first cell from moving towards the other cells. The respective casing structure may include one or more openings to direct the heat and slag away from the other cells.

Many existing battery packs use little or no insulation in order to reduce the likelihood of thermal events. If a cell is insulated, the heat that the cell generates during operation may build up and result in a thermal event. A lithium cell, for example, may experience a thermal event if the temperature of the cell reaches one-hundred-and-eighty-point-five degrees Celsius. Thus, existing battery packs may not use insulation to ensure lower operating temperature of the cells.

In contrast, the inventors have recognized that insulation may be useful in containing a thermal event to a single cell and preventing the spread of a thermal event to a second cell, a third cell, and so on. Devices 100 and 150 may include insulating casing structures with openings to allow heat to move away from the cells during a thermal event. The casing structures may prevent the heat of a thermal event from propagating directly towards the other cells of the battery pack.

Two tests were performed on the devices of this disclosure. First, the battery packs were run at full current and at the maximum operating temperature to make sure that the cells did not go into thermal runaway. The cells were monitored during the test to ensure that the cells did not get too hot, which may be caused by too much insulation. Second, a cell was caused to go into thermal runaway multiple times and in multiple orientations, and the temperatures of the nearby cells were monitored to ensure that the nearby cells did not get close to experiencing a thermal event.

The Federal Aviation Administration (FAA) has recognized that thermal events are important, but the FAA and the industry have not recognized the importance of circuit boards and casing structures to containing thermal events. Furthermore, no one has recognized that the orientation of the casing structures and the cells affects whether thermal events spread from a first cell to a second cell. Casing structures 120A, 122A, 170A, and 170B and circuit boards 110 and 160 may be designed, positioned, and oriented to impede the flow of heat between two of cells 130A, 132A, 180A, and 180B.

Although not shown in FIG. 1, the housing of device 100 may also be designed to reduce the damage caused by thermal events. The housing of device 100 may enclose circuit board 110, casing structures 120A, 122A, 170A, and 170B, and cells 130A, 132A, 180A, and 180B. The housing may include polyvinyl chloride (PVC) heat shrink that can prevent foreign object debris (FOD) from entering the battery pack. The housing may be configured to securely hold the contents of the battery pack, prevent tampering, and provide an easy spot for labeling, and prevent FOD from damaging and shorting the cells. The housing may also include one or more openings to release heat and pressure from a thermal event, in order to reduce the likelihood that the thermal event spreads to more than one cell. In contrast, an existing battery pack may have a housing that wraps around the cells, preventing heat from moving away and directing heat toward other cells.

Figure 2:
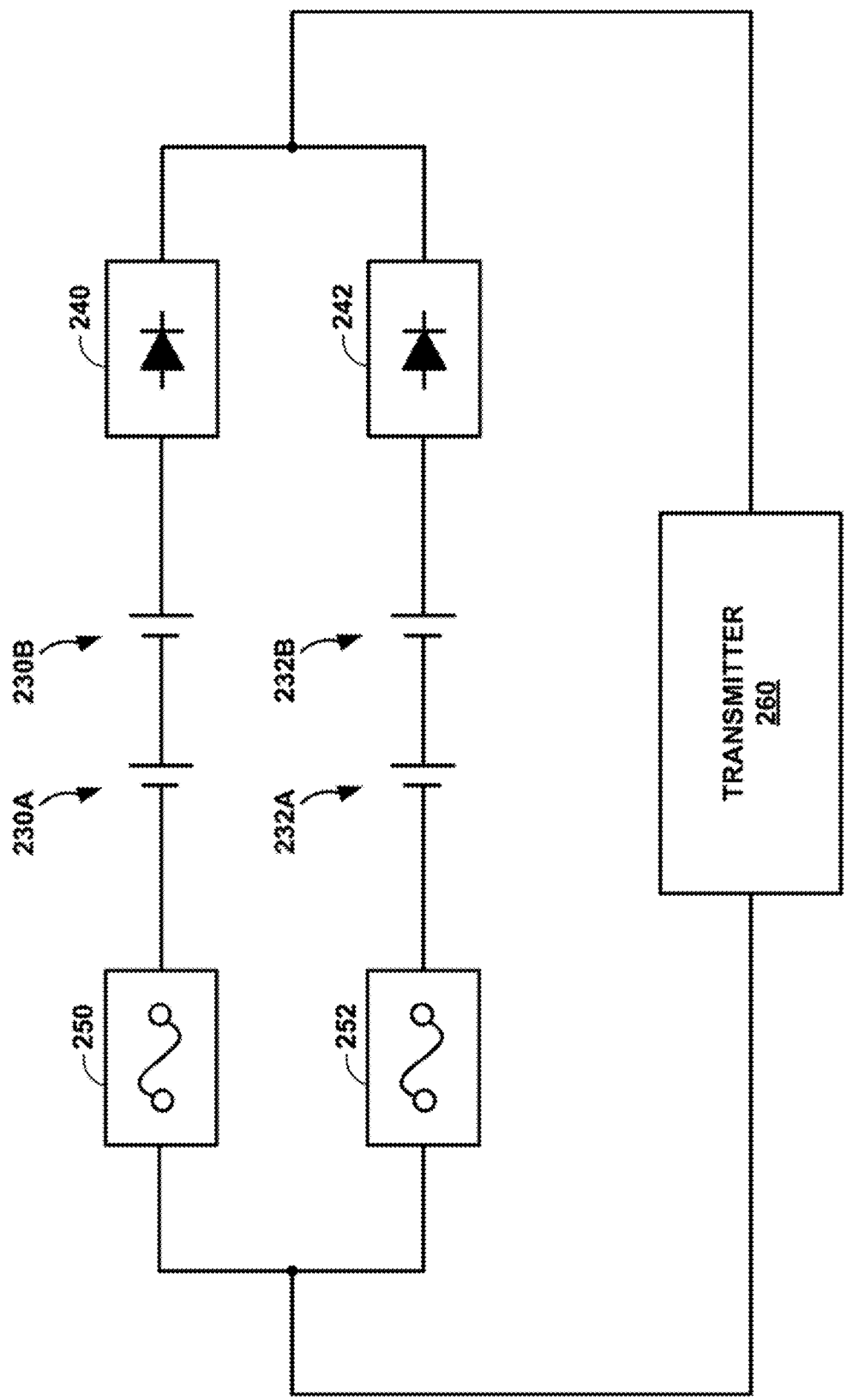
FIG. 2 is a conceptual block and circuit diagram of two parallel strings of cells, in accordance with some examples of this disclosure.

FIG. 2 is a conceptual block and circuit diagram of two parallel strings of cells 230A, 230B, 232A, and 232B, in accordance with some examples of this disclosure. Each parallel string may also include other components, such as a fuse, a diode, and/or any other components. Each of cells 230A, 230B, 232A, and 232B may produce three volts, such that each string produces six volts. The electrical current from each string may add together to supply electrical power to transmitter 260 or any other electrical load. In some examples, the two or more strings may provide redundancy in the event that one string fails and the other string continues to operate. However, in some examples, a single string may not be able supply transmitter 260 with sufficient electrical power for an extended period of time.

Another device may use a single cell or two cells in parallel, where each cell can produce a sufficient supply voltage (e.g., six volts). The cells of the other device may be larger than cells 230A, 230B, 232A, and 232B. Alternatively, a battery pack may include two larger cells in series, where each cell produces half of the desired supply voltage but more electrical current than one of cells 230A, 230B, 232A, and 232B. As a result, the larger cells may produce more heat during a thermal event, which may cause increased damage in the larger system, as compared to a thermal event in only one of cells 230A, 230B, 232A, and 232B.

Diodes 240 and 242 are configured to allow electrical power to flow from cells 230A, 230B, 232A, and 232B to transmitter 260. Each of diodes 240 and 242 are electrically connected in series with a string of cells through a circuit board. Diodes 240 and 242 may prevent the reverse flow of electrical power, which may re-charge cells 230A, 230B, 232A, and 232B. Diodes 240 and 242 may be useful for primary (i.e., non-rechargeable) cells. Each of diodes 240 may include a transistor in parallel with a diode to reduce the voltage drop across the diode to, in some examples, less than one hundred millivolts. The transistor may have a much smaller voltage drop than a traditional diode, which may drop approximately five hundred millivolts or seven hundred millivolts. An example of diodes 240 and 242 is a smart bypass diode, such as SM74611 made by Texas Instruments of Dallas, Tex.

The use of a smart bypass diode with a relatively low voltage drop may allow for the use of smaller cells. For example, if a voltage supply of six volts is needed, two cells in series may produce just over three volts each. If the design uses a traditional diode with a seven-hundred-millivolt voltage drop, the efficiency of the battery pack will decline as only five-point-three volts will be available to the equipment. If the cells include nonzero internal series resistance, the supply voltage that is available to the equipment may be even lower. The design of the battery pack with a traditional diode may require higher-capacity cells or more cells in series to get higher voltages to provide sufficient electrical energy.

In addition, a smart bypass diode may allow for easier testing to confirm that both strings of cells 230A, 230B, 232A, and 232B are working properly. Each smart bypass diode may experience a relatively short voltage pulse during which the voltage drop across the diode increases from approximately fifty millivolts to approximately five hundred millivolts. During the pulse, the charge pump of the smart bypass diode re-charges. If the pulses reoccur at regular intervals, a tester may determine whether both of diodes 240 and 242 are active by measuring the voltage drop and comparing the pulse frequency of the voltage to the pulse frequency of a single smart bypass diode. If the pulse frequency of the voltage is two times the pulse frequency of a single smart bypass diode, then two strings are active.

Fuses 250 and 252 may be electrically connected in series with one of the strings of cells 230A, 230B, 232A, and 232B and diodes 240 and 242. Each of fuses 250 and 252 may be configured to break in response to a sufficiently high electrical current, such as 1.5 amperes. For example, if there is a thermal event in cells 230A or 230B, the electrical current through cells 232A and 232B may spike, causing fuse 252 to break and prevent any further electrical current. Thus, fuse 252 may prevent cells 232A and 232B from excessive electrical currents caused by a thermal event in cell 230A or 230B, which may cause the electrical current through cells 230A and 230B to go to zero.

Transmitter 260 may be configured to transmit position-indicating signals in response to an emergency such as a crash, other high-G-force event, or activation by a switch available to a vehicle operator. In some examples, transmitter 260 may be configured to transmit signals at 406 megahertz. Transmitter 260 may include one or more voltage regulators (e.g., switching voltage regulators) to supply a voltage signal to one or more electrical loads within transmitter 260. One string of cells may not be able to generate a sufficient electrical current to supply all of the components and voltage regulators of transmitter 260. For a switching voltage regulator, a lower supply voltage may result in the regulator drawing a larger supply electrical current. The larger supply electrical current may cause a larger voltage drop across the series resistance, which further lowers the supply voltage, resulting in an even larger supply electrical current. This problem may be more acute when the battery has been on for several hours and at relatively low temperatures.

A high-energy-density battery pack of this disclosure may be able to contain a single cell thermal event within an emergency position-indicating transmitter, such as an emergency locator transmitter (ELT). The battery pack realizes the following advantageous characteristics. First, the battery pack reduces both the maximum power and total energy release during a single cell thermal event. Second, the battery pack distributes the thermal energy resulting from a single cell event to avoid localized heating on the device case (hotspots). Third, the battery pack reduces shorting paths internal to the battery pack. This battery pack is also the first known battery design to meet the new FAA requirements, as demonstrated by formal certification tests.

The battery pack was developed by conducting studies that attempted to balance the power required for the ELT and the division of this power over multiple cells. A single cell battery providing all the power was the simplest and most efficient design. However, it was discovered that the maximum power and total energy released from one large cell had no reasonable chance of containment upon initiation of a thermal event. It was also discovered that, during a single cell thermal event, temperatures in the cell were above twelve hundred degrees Celsius, releasing substantial energy.

Figure 3:
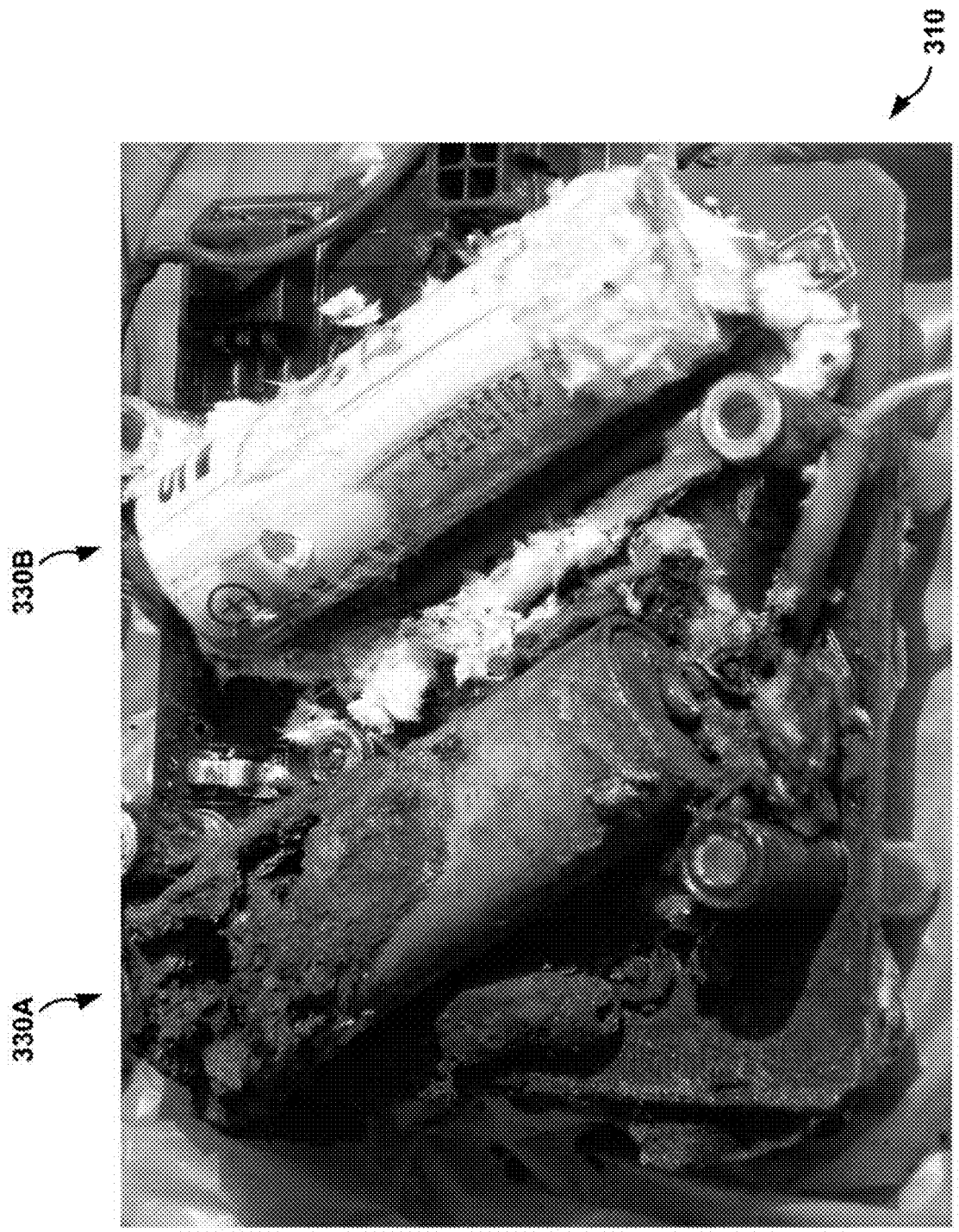
FIG. 3 is a photograph of two high-energy-density cells after a thermal event, in accordance with some examples of this disclosure.

FIG. 3 is a photograph of two high-energy-density cells 330A and 330B after a thermal event, in accordance with some examples of this disclosure. As shown in FIG. 3, the thermal event was, in effect, a cell "explosion" that destroys the internals of the cell and melts the stainless steel casing. High-energy-density cell 330A may have experienced a thermal event, and molten slag from high-energy-density cell 330A may have moved towards high-energy-density cell 330B. The slag may have caused high-energy-density cell 330B to also experience a thermal event. Circuit board 310 is visible underneath high-energy-density cells 330A and 330B.

The study revealed that four lithium cells were required to meet the power and pulse current requirements of ELTs. As shown in FIG. 2, the design may employ two parallel strings of two series-connected three volt, three ampere-hour (Ah) primary lithium (for example, LM17500 lithium manganese dioxide cells made by Saft Groupe S.A. of Bagnolet, France) A-size cells. These lithium cells were tested to satisfy the Minimum Operational Performance (MOP) Radio Technical Commission for Aeronautics (RTCA) D0-227 standards for lithium batteries, and are able to supply a large pulse current at cold temperatures (e.g., negative twenty degrees Celsius).

The study also revealed that, given the high pulse current and the time required to operate at minimum temperatures (e.g., negative twenty degrees Celsius), the use of conventional diodes to protect the parallel strings could not be used. It was discovered that the effective diode voltage drop (normally 0.55-0.7 volts at room temperature) increased as temperature dropped, thereby consuming battery capacity at a greater rate and rendering the use of two series A cells ineffective. As shown in FIG. 2, each string may include a smart bypass diode (e.g., diodes 240 and 242) in series with each string of cells. These diodes reduced the effective diode voltage drop to less than one hundred millivolts at the required minimum temperatures.

The battery pack may also include a timer (for example DS1682 made by Maxim Integrated of San Jose, Calif.) for tracking battery usage. The timer may trigger an alarm if the battery has been overused. The design may also use a standard (0.125 inches thick) glass epoxy (Panasonic R-1755V) PCB for solid electrical connections, for support of the appropriate protection electronics, e.g., smart bypass diodes and fuses, and for flame/heat resistance and structural integrity. The circuit board also removes the biggest cause of short circuits—the wiring from the battery pack.

Further study revealed that the containment of the molten slag from a single A cell explosion, and the propagation of the explosion to the adjacent cells, were significant problems. The new design solved these problems through the use of casing structures including ceramic blankets and stainless steel (0.020 inches thick) battery holders, together with a careful selection of cell orientation/spacing, to contain each single A cell explosion while also limiting the propagation of the explosion.

Each ceramic blanket (e.g., casing structure) preferably comprises alumina flexible ceramic (Cotronics 390) tape that is disposed around a respective cell. Each cell holder may include a substantially U-shape to thereby retain the respective cell therein. Each cell holder (e.g., casing structure) may be disposed between the circuit board and the respective cell, and may be configured to limit the amount of heat that can escape to the surrounding cells. The casing structure may contain the slag during a thermal event and/or move it away from the other cells. The casing structures may be misaligned with respect to the sides of the circuit board in order to move heat away from other cells.

FIG. 4 is a perspective-view diagram of a circuit board 410 before mounting casing structures, in accordance with some examples of this disclosure. FIG. 4 illustrates a first side of circuit board 410 including diode 440 mounted to circuit board 410 and barriers 470A-470D. Barriers 472A and 472B are also visible on the second side of circuit board 410. The first side of circuit includes four holes for receiving screws through casing structures on the first side. Threadlocker 460 is also visible on the first side of circuit board 410 for a screw inserted on the second side of circuit board 410. In some examples, circuit board 410 may include fastening elements other than screws, such as nails, rivets, solder, or the like. The device may also include a connection element (depicted near diode 440) for electrically connecting the cells to an electrical load such as a transmitter.

FIG. 5 is a perspective-view diagram of a circuit board 510 and casing structures 520A, 520B, 522A, and 522B before installing cells, in accordance with some examples of this disclosure. Each casing structure may include a first casing element between the cell and circuit board 510, where the first casing element is parallel to circuit board 510. For example, casing structure 520A includes a first casing element that is positioned between plate 524A and a cell on one side of the first casing element and circuit board 510 on the other side of the first casing element.

Each casing structure may include a second casing element that is perpendicular to the plane of circuit board 510. For example, casing structure 520A includes a second casing element that is upright and parallel to the second casing element of casing structure 520B. The second casing element of casing structure 520A is positioned between two cells.

Figure 7:
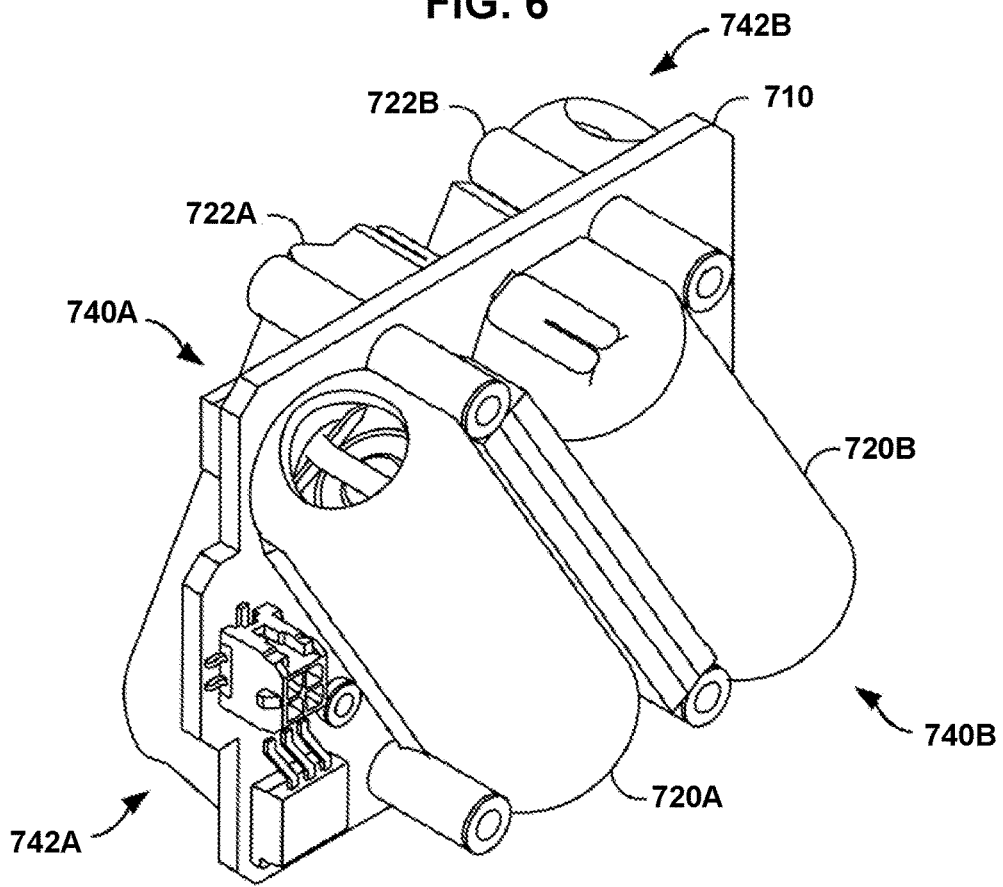
FIG. 7 is a perspective-view diagram of casing structures that partially enclose cells with openings, in accordance with some examples of this disclosure.

The two casing elements of a casing structure may be a single structure or two separate pieces. As depicted in FIG. 5, the casing elements may be oriented at ninety degrees with respect to each other. As depicted in FIG. 7, a manufacturing process may include wrapping the casing elements around a respective cell. The casing structure may physically hold the respective cell in place, absorb heat during a thermal event, and direct or move heat during a thermal event.

Plate 524A may be attached to circuit board 510 and casing structure 520A by two screws. Plate 524A may be configured to receive a cell. Plate 524A may also be configured to electrically connect the cell to other components through circuit board 510. Plate 524A, casing structure 520A, and circuit board 510 may provide high-temperature barriers to the heat from a thermal event in a cell positioned in casing structure 520A.

Figure 6:
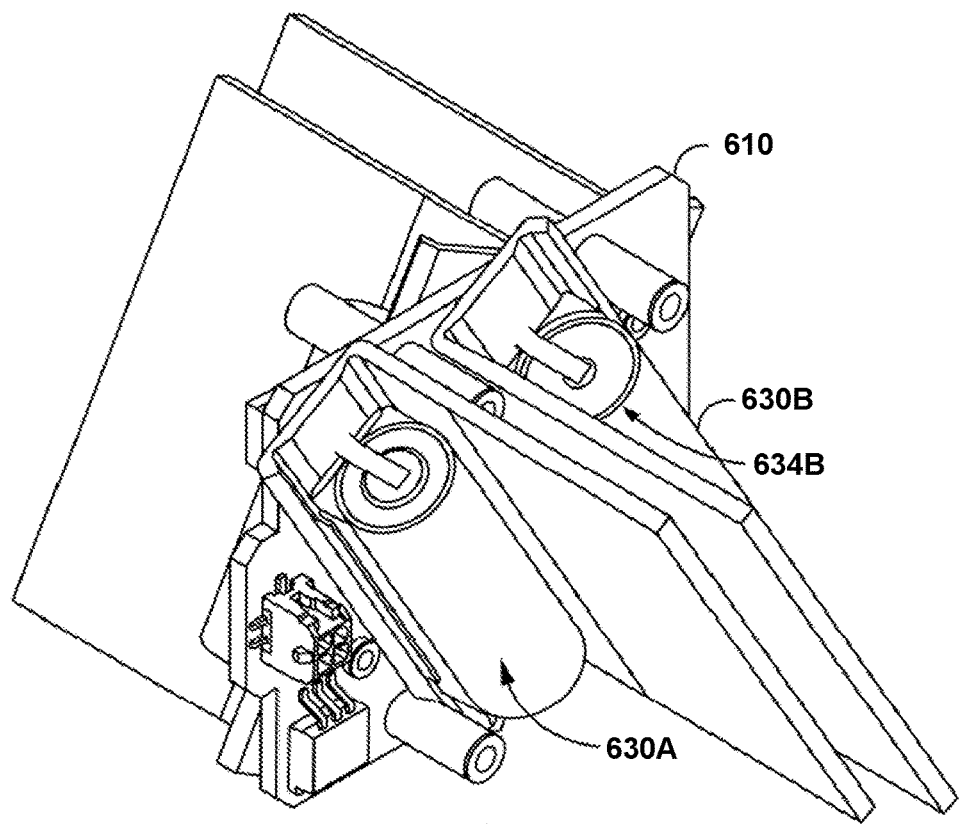
FIG. 6 is a perspective-view diagram of cells positioned in casing structures, in accordance with some examples of this disclosure.

FIG. 6 is a perspective-view diagram of cells 630A and 630B positioned in casing structures, in accordance with some examples of this disclosure. Cell 630B includes insulation cap 634B on a terminal end of cell 630B. As depicted in FIG. 6, cell 630A points towards the top-left corner of circuit board 610, and cell 630B points towards the bottom-right corner of circuit board 610. The cells on the other side of circuit board 610 may point towards the top-right corner and the bottom-left corner of circuit board 610. By pointing the cells towards different corners the battery pack may reduce the likelihood that a thermal event in one cell spreads to another cell.

FIG. 7 is a perspective-view diagram of casing structures 720A, 720B, 722A, and 722B that partially enclose cells with openings 740A, 740B, 742A, and 742B, in accordance with some examples of this disclosure. For example, opening 740A of casing structure 720A points towards the top-left corner of circuit board 710, and opening 740B of casing structure 720B points towards the bottom-right corner of circuit board 710.

The casing structures of FIG. 7 may initially be installed in similar configurations to the casing structures of FIGS. 5 and 6. The outer casing element may be wrapped around the respective cell like a blanket to partially enclose the cell. The casing structure may have a cylinder-like shape when the casing structure is wrapped around the cell. The ends of the cylinder may be rounded, as shown in FIG. 7. The casing structure may cocoon the cell with one end tightly closed and the other end partially opened to allow the release of heat during a thermal event. The casing structure may be configured to insulate the respective cell and provide a pathway for the release of heat.

As shown in FIG. 7, each cell has its own casing structure that at least partially surrounds the cell. Each respective casing structure may be configured to surround a respective cell by leaving at least one end of the respective cell open on one end. Each cell may be a three-dimensional object, and the respective casing structure may surround an entire circumference (e.g., a two-dimensional cross section) of the cell. Each casing structure may be configured to surround the respective cell in two dimensions with an opening in a third dimension on one end.

Each cell may have a cylindrical shape with a curved surface (e.g., a longitudinal surface or an elongated surface) and two flat surfaces on the ends of the cylinder. In some examples, the surfaces on the ends of the cylinder may be slightly curved, such that the end surfaces are not be completely flat. The respective casing structure may entire surround and/or cover one flat surface and partially surround and/or cover the curved surface. In some examples, the casing structure may surround and/or cover at least fifty percent, at least sixty percent, or at least eighty percent of the cell. The cell may also include a rectangular shape with only one surface of the rectangular shape exposed by the respective casing structure.

Figure 8:
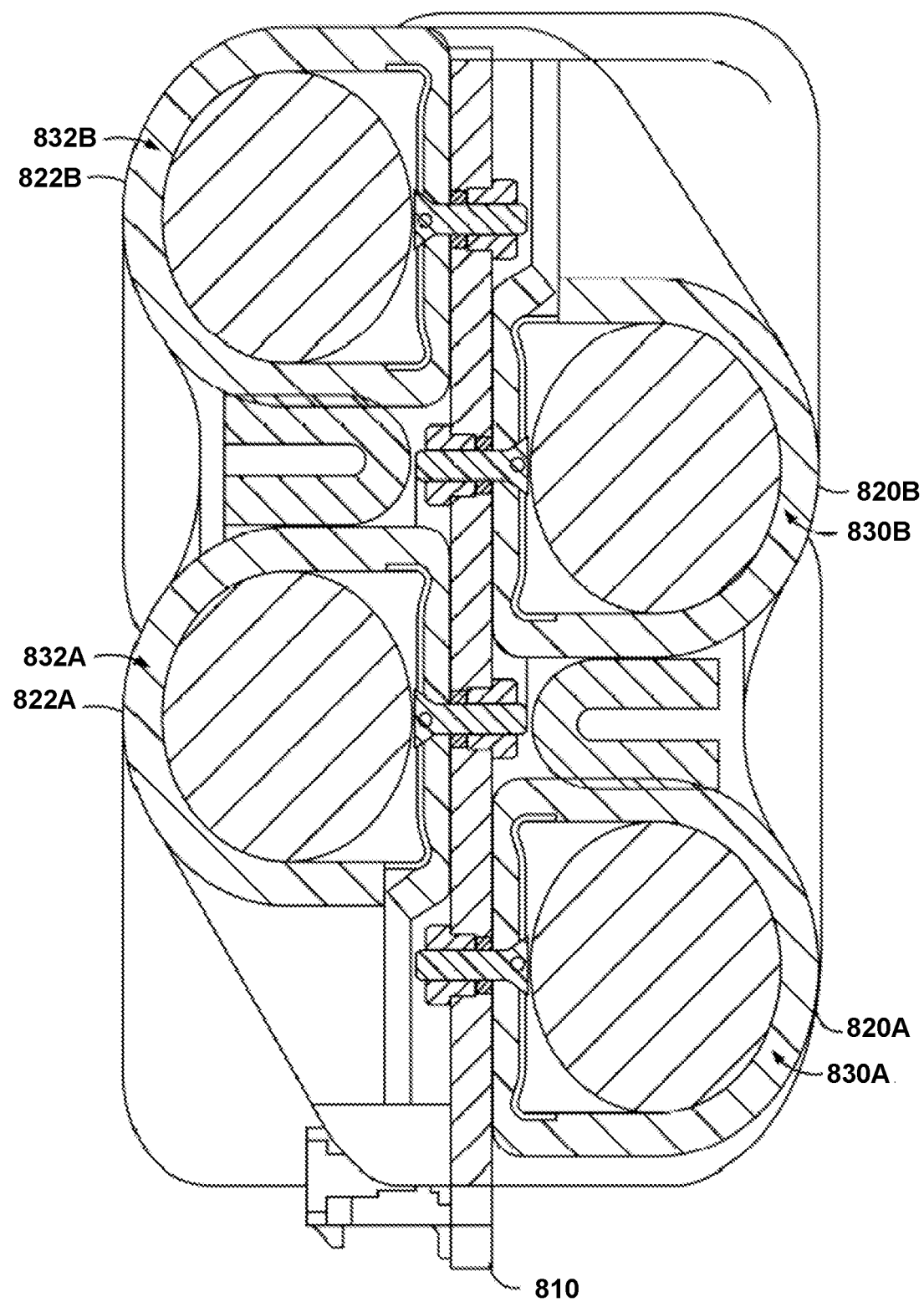
FIG. 8 is a top-view diagram of cells positioned in casing structures, in accordance with some examples of this disclosure.

FIG. 8 is a top-view diagram of cells 830A, 830B, 832A, and 832B positioned in casing structures 820A, 820B, 822A, and 822B, in accordance with some examples of this disclosure. FIG. 8 illustrates cells 830A, 830B, 832A, and 832B positioned at offset locations, such that cell 830A is not directly across circuit board 810 from cell 832A. In addition, cell 832A is not directly across circuit board 810 from cell 830B. The offset positions of cells 830A, 830B, 832A, and 832B may reduce the likelihood that a thermal event in one cell spreads to a second cell.

Figure 9:
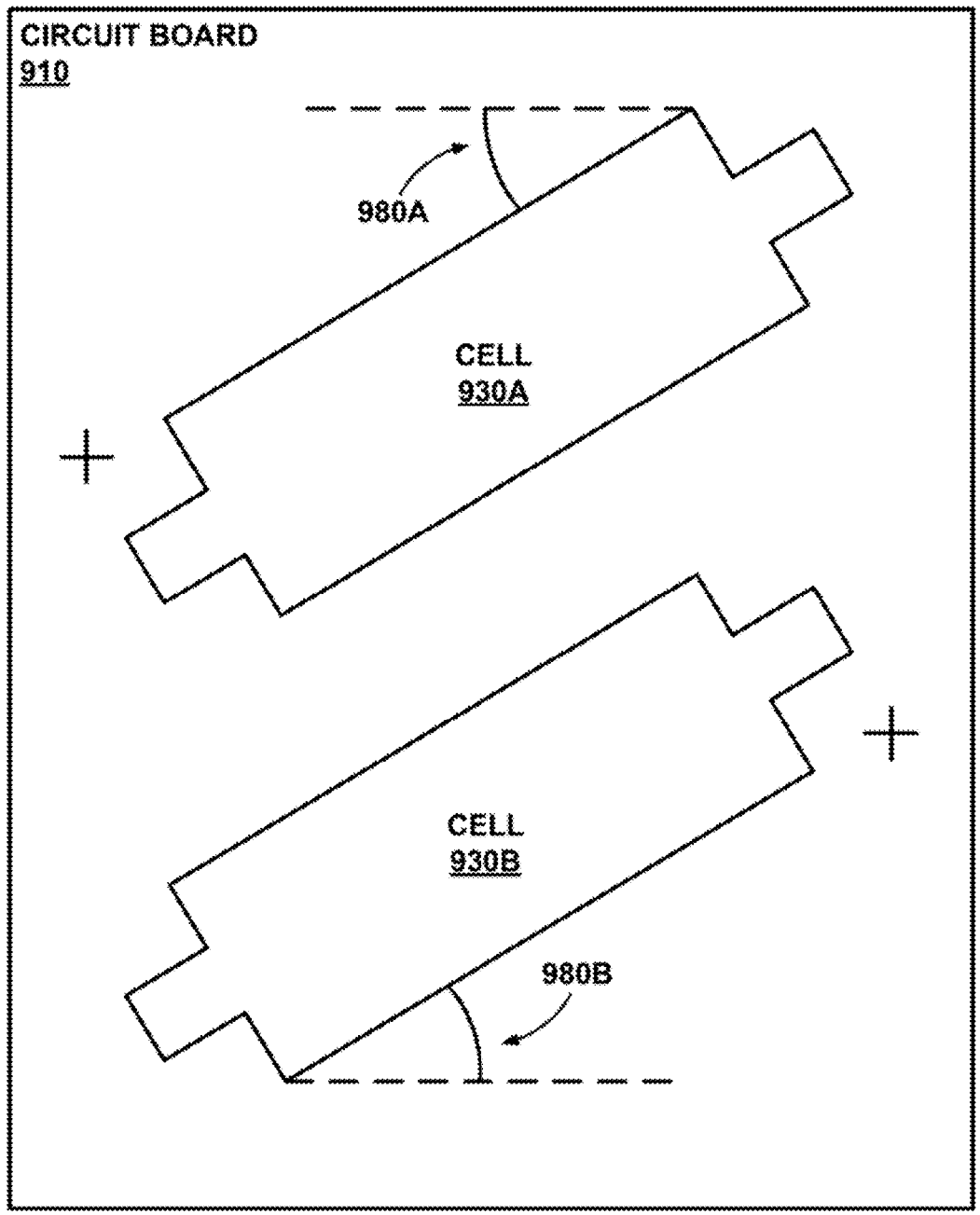
FIG. 9 is a conceptual block diagram of two cells positioned at parallel but opposite directions, in accordance with some examples of this disclosure.

FIG. 9 is a conceptual block diagram of two cells 930A and 930B positioned at parallel but opposite directions, in accordance with some examples of this disclosure. For example, cell 930A may be oriented at angle 980A below a baseline, such as a horizontal line or any other arbitrary line. Angle 980A may be twenty degrees, thirty degrees, forty degrees, or any other suitable angle. The positive terminal of cell 930A may be positioned towards the left side of circuit board 910. In the example of FIG. 9, the negative terminals of cells 930A and 930B are pointed towards corners of circuit board 910 because the negative terminals may have cell vents that are aligned with and positioned at the openings on the respective casing structures. In some examples, the positive terminals could include cell vents that are aligned with and positioned at the openings on the respective casing structures.

Cell 930B may be oriented at angle 980B above a baseline, such as a horizontal line or any other arbitrary line. Angle 980B may be twenty degrees, thirty degrees, forty degrees, or any other suitable angle. The positive terminal of cell 930B may be positioned towards the right side of circuit board 910. Angle 980A is offset from angle 980B at an angle that is equal to the sum of angles 980A and 980B, which may be at least twenty degrees or at least thirty degrees. The total offset angle is the sum of angles 980A and 980B because angle 980A is measured downward from horizontal and angle 980B is measured upward from horizontal. A larger offset angle may mean that the openings of the casing structures for cells 930A and 930B are oriented away from the other cell in order to more heat away from the other cell during a thermal event.

Angle 980A may be equal to angle 980B such that cells 930A and 930B are pointed in parallel but opposite directions. Cells 930A and 930B are pointed in opposite directions because the negative terminal of cell 930A is pointed towards the top-right corner of circuit board 910 and the negative terminal of cell 930B is pointed towards the bottom-left corner of circuit board 910.

Figure 10:
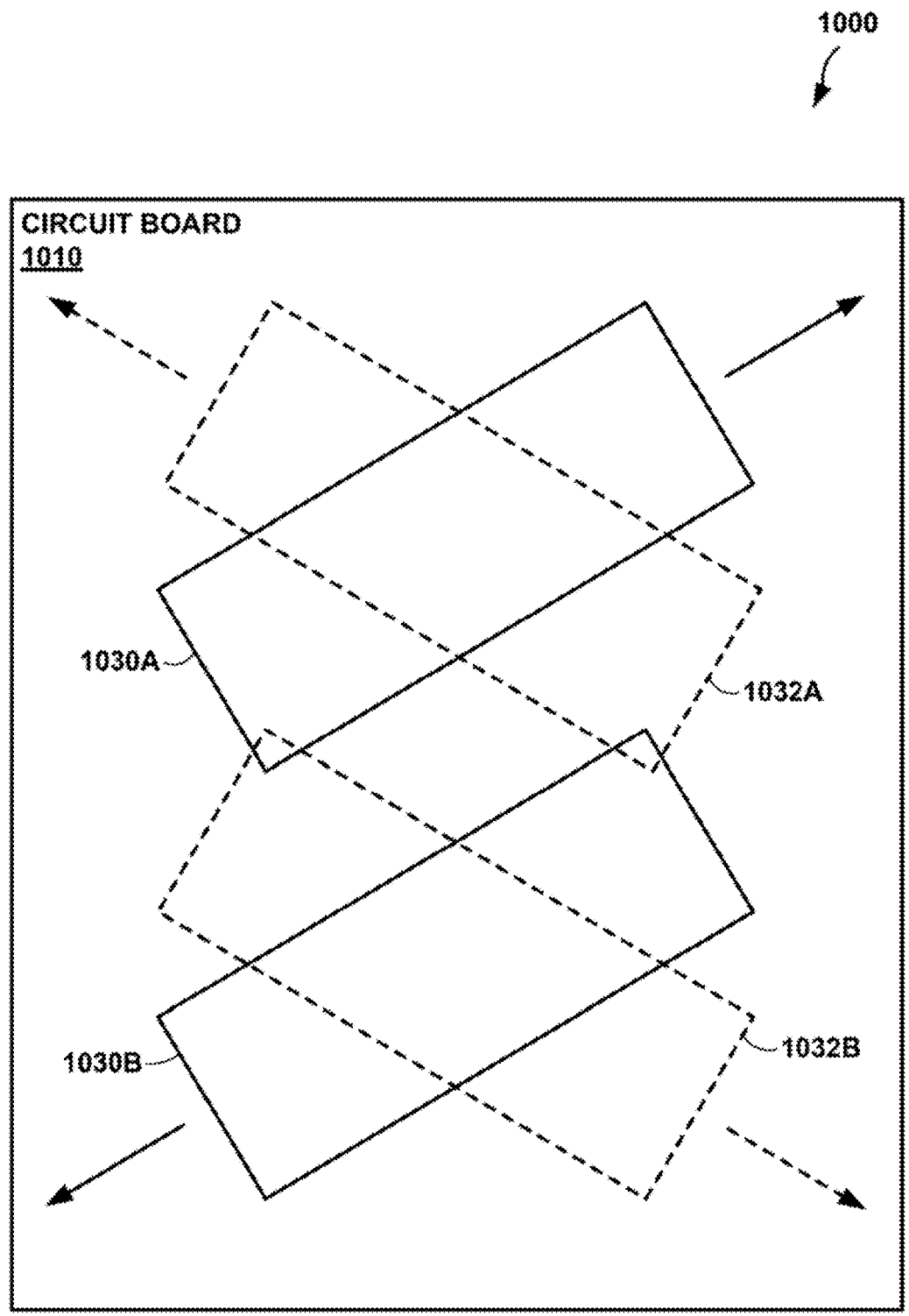
FIG. 10 is a conceptual block diagram of four cells oriented at four different angles, in accordance with some examples of this disclosure.

FIG. 10 is a conceptual block diagram of four cells 1030A, 1030B, 1032A, and 1032B pointed in four different directions, in accordance with some examples of this disclosure. Each of cells 1030A, 1030B, 1032A, and 1032B may be positioned in a casing structure with an opening pointed in a direction away from the other cells. The openings for each of cells 1030A, 1030B, 1032A, and 1032B may be pointed towards each of the four corners of circuit board 1010 such that each of cells 1030A, 1030B, 1032A, and 1032B may move heat towards a unique corner.

For example, cell 1030A may be positioned in a casing structure with an opening pointed towards the top-right corner of circuit board 1010. Cell 1030B may be positioned in a casing structure with an opening pointed towards the bottom-left corner of circuit board 1010. Cell 1032A may be positioned in a casing structure with an opening pointed towards the top-left corner of circuit board 1010. Cell 1032B may be positioned in a casing structure with an opening pointed towards the bottom-right corner of circuit board 1010. Thus, if any of cells 1030A, 1030B, 1032A, and 1032B experiences a thermal event, the respective casing structure may be configured to move or direct heat in a direction away from the other cells.

Cell 1030A may be partially enclosed by a respective casing structure with an opening that points in a first direction (e.g., towards the top-right corner of circuit board 1010). Cell 1030B may be partially enclosed by a respective casing structure with an opening that points in a second direction (e.g., towards the bottom-left corner of circuit board 1010) that is opposite of the first direction. Cell 1032A may be partially enclosed by a respective casing structure with an opening that points in a third direction (e.g., towards the top-left corner of circuit board 1010). Cell 1032B may be partially enclosed by a respective casing structure with an opening that points in a fourth direction (e.g., towards the bottom-right corner of circuit board 1010) that is opposite of the third direction.

As used herein, the terms "parallel" or "same direction" may mean that two objects are exactly parallel. The terms "parallel" or "same direction" may also mean that two objects are within an angular threshold of exactly parallel, such as within five degrees of exactly parallel, within ten degrees of exactly parallel, or within twenty degrees of exactly parallel. As used herein, the term "perpendicular" may mean that two objects are exactly perpendicular or that the two objects are within an angular threshold of exactly perpendicular, such as within five degrees of exactly perpendicular, within ten degrees of exactly perpendicular, or within twenty degrees of exactly perpendicular.

As used herein, the term "opposite direction" may mean that two objects point in directions that are offset by exactly one-hundred-and-eighty-degrees or that the two objects point in directions that are offset within an angular threshold of exactly one-hundred-and-eighty-degrees, such as within five degrees of one-hundred-and-eighty-degrees, within ten degrees of one-hundred-and-eighty-degrees, or within twenty degrees of one-hundred-and-eighty-degrees. The terms "pointed at" and "pointed in the direction of" may mean that a first object points exactly at a second object or location, or that the first object points within an angular threshold of the second object or location, such as within five degrees of the second object or location, within ten degrees of the second object or location, or within twenty degrees of the second object or location. As used herein, a cell points in a direction or at an angle based on the direction or angle of a vector from a first terminal of the cell to a second terminal of the cell. A cell may point at a corner of a circuit board based on the angle of a vector from a first terminal to a second terminal that is near an opening of the casing structure.

As shown in FIGS. 3, 6, 7, 9, and 10, the cells (e.g., lithium cells) are oriented at an oblique angle (preferably diagonally) relative to the sides of the circuit board to limit the amount of heat that might emanate from the screws (that hold the cell holders, e.g., the casing structures) and transfer through the ceramic blankets and the circuit board to the cell on the opposite side of the circuit board. Further, the cell vents and the openings in the casing structures are oriented towards the corners of the circuit board to reduce the likelihood that molten slag that may be expelled from one of the cells does not directly fall on a neighboring cell.

As shown in FIGS. 5-8, in the preferred method of manufacture a portion of each ceramic blanket is disposed between the circuit board and the respective cell holder, and the cell holder is screwed to the circuit board, thereby securing the ceramic blanket to the circuit board and thermally isolating the cell holder and the cell from the circuit board. The cell is then disposed with in the respective U-shaped cell holder and secured to the cell holder with epoxy.

The remaining portion of the ceramic blanket is then wrapped around the exposed cylindrical surface of the cell, thereby protecting the surrounding cells from heat as molten slag is ejected from the cell during a thermal event. In some examples, the casing structure may be molded using ceramic materials or other materials. However, as shown, preferably the ends of each cell are not enclosed by the ceramic blanket, but are instead left exposed, to thereby direct the heat from the molten slag away from the circuit board.

After all the cells are wrapped in their respective ceramic blankets, preferably the assembled lithium battery pack is then encapsulated in a thin-walled semi-rigid (ShrinkSleeve polyvinyl lay-flat (PVLF)) PVC tubing.

Figure 11:
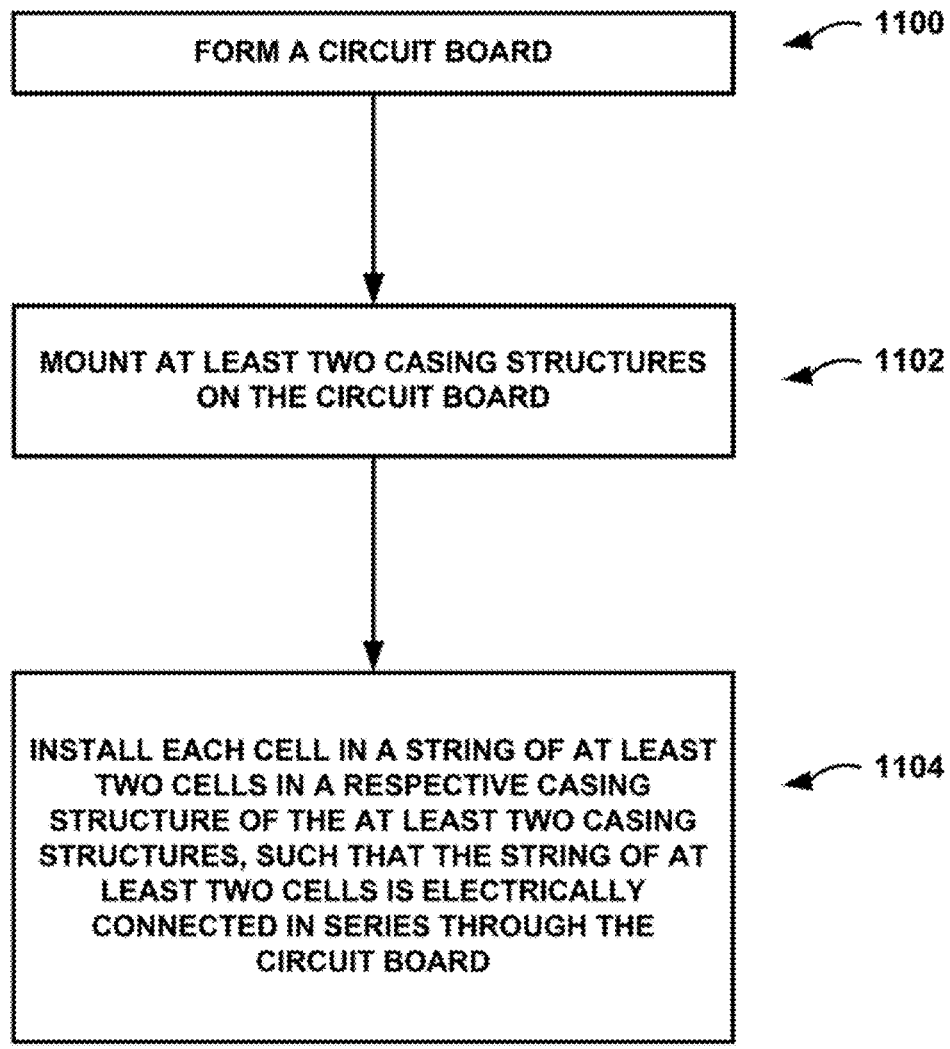
FIG. 11 shows a flowchart for example techniques for constructing a high-energy-density battery pack device including cells positioned in casing structures, in accordance with some examples of this disclosure.

FIG. 11 shows a flowchart for example techniques for constructing a high-energy-density battery pack device including cells positioned in casing structures, in accordance with some examples of this disclosure. The techniques of FIG. 11 are described with reference to the devices of FIGS. 4-7, including devices 100 and 1000 of FIGS. 1 and 10, although other components may perform similar techniques.

In the example of FIG. 11, a manufacturing process includes forming circuit board 410 (1100). The circuit board 410 may be constituted from a PCB, such as a printed wiring board, a flex circuit board, a protoboard, and/or any other circuit board. In some examples, circuit board 410 may have a higher temperature rating than the melting temperature of lithium or another material in the cells. In the example of FIG. 11, the manufacturing process also includes mounting casing structures 520A and 520B on a first side of circuit board 510 (1102). Each of casing structures 520A and 520B may be mounted on circuit board 510 using a fastening element such as a screw, nail, solder, or another fastener. Each of casing structures 520A and 520B may also include a plate for holding a cell and electrically connecting the cell to circuit board 510.

In the example of FIG. 11, the manufacturing process also includes installing each of cells 630A and 630B in a respective one of the respective casing structures (1104). The installation of cells 630A and 630B may include electrically connecting each cell to circuit board 510. After installing cells 630A and 630B, the manufacturing process may further include wrapping each of the respective casing structures around a respective one of cells 630A and 630B. Each of the respective casing structures may provide an opening for cells 630A and 630B.

In the example of FIG. 11, the manufacturing process can also include mounting casing structures 522A and 522B on a second side of circuit board 510. In the example of FIG. 11, the manufacturing process can also include installing each of the respective cells in a respective one of the casing structures on the second side of circuit board 610. The cells on the second side of circuit board 610 may be electrically connected in series as a second string, where the second string of cells may be electrically connected in parallel with a first string of cells 630A and 630B. Connecting two cells in series may increase the voltage level of the power supply, and connecting two cells in parallel may increase the amplitude of supply electrical current.

The following examples may illustrate one or more of the techniques of this disclosure.

Example 1. A high-energy-density battery pack device includes a circuit board and at least two casing structures mounted on the circuit board. In some examples, the high-energy-density battery pack device also includes at least two cells electrically connected in series or in parallel through the circuit board. In some examples, each respective cell of the at least two cells is positioned in a casing structure of the at least two casing structures. In some examples, the respective casing structure surrounds the respective cell with an opening on one end of the cell.

Example 2. The device of example 1, wherein the at least two cells includes a first cell and a second cell, and the at least two casing structures includes a first casing structure partially enclosing the first cell with an opening towards a first corner of the circuit board. The at least two casing structures also includes a second casing structure partially enclosing the second cell with an opening towards a second corner of the circuit board, wherein the first corner of the circuit board is different than the second corner.

Example 3. The device of examples 1-2 or any combination thereof, wherein the at least two cells are electrically connected in series as a first string of at least two cells, and the device further includes a second string of at least two cells electrically connected in series through the circuit board. The first string of at least two cells is electrically connected in parallel with the second string of at least two cells through the circuit board. The second string of at least two cells includes a third cell and a fourth cell, and the at least two casing structures includes a third casing structure partially enclosing the third cell with an opening towards a third corner of the circuit board, wherein the fourth corner of the circuit board is different than the second corner and the first corner. The at least two casing structures further includes a fourth casing structure partially enclosing the fourth cell with an opening towards a fourth corner of the circuit board, wherein the fourth corner of the circuit board is different than the third corner, the second corner, and the first corner.

Example 4. The device of examples 1-3 or any combination thereof, wherein the first casing structure and the second casing structure are mounted on a first side of the circuit board, and the third casing structure and the fourth casing structure are mounted on a second side of the circuit board.

Example 5. The device of examples 1-4 or any combination thereof, wherein the first casing structure and the second casing structure are configured to orient the first cell and the second cell at a first angle relative to a baseline. The third casing structure and the fourth casing structure are configured to orient the third cell and the fourth cell at a second angle relative to the baseline, and the first angle is offset from the second angle by at least thirty degrees.

Example 6. The device of examples 1-5 or any combination thereof, further including a bypass diode electrically connected in series with a cell of the at least two cells through the circuit board, wherein the bypass diode causes a voltage drop across the bypass diode of less than two hundred millivolts.

Example 7. The device of examples 1-6 or any combination thereof, wherein each casing structure of the at least two casing structures includes a metal casing structure or a ceramic casing structure.

Example 8. The device of examples 1-7 or any combination thereof, wherein the at least two casing structures includes a first casing structure and a second casing structure, wherein an opening of the first casing structure and an opening of the second casing structure are parallel and oriented in opposite directions.

Example 9A. The device of examples 1-8 or any combination thereof, wherein the at least two cells includes a first cell and a second cell, and the first casing structure is configured to partially enclose the first cell, wherein an opening of the first casing structure points in a first direction. The second casing structure is configured to partially enclose the second cell, wherein an opening of the second casing structure points in a second direction that is opposite of the first direction.

Example 9B. The device of examples 1-9A or any combination thereof, wherein each cell of the at least two cells has a cylindrical shape with a curved surface, a first flat surface, and a second flat surface. The respective casing structure covers a first flat surface and at least eighty percent of a curved surface of the respective cell.

Example 10. A device includes a high-energy-density battery pack that includes a circuit board and at least two casing structures mounted on the circuit board. The high-energy-density battery pack also includes at least two cells electrically connected in series or in parallel through the circuit board. Each cell of the at least two cells is positioned in a casing structure of the at least two casing structures. The respective casing structure surrounds the respective cell with an opening on one end of the cell. The device further includes a transmitter configured to receive electrical power from the at least two cells through the circuit board. The transmitter is also configured to transmit electromagnetic signals based on the electrical power.

Example 11. The device of example 10, wherein the at least two cells includes a first cell and a second cell. The at least two casing structures includes a first casing structure partially enclosing the first cell with an opening towards a first corner of the circuit board and a second casing structure partially enclosing the second cell with an opening towards a second corner of the circuit board, wherein the first corner of the circuit board is different than the second corner.

Example 12. The device of examples 10-11 or any combination thereof, wherein the at least two cells are electrically connected in series as a first string of at least two cells, and the device further includes a second string of at least two cells electrically connected in series through the circuit board. The first string of at least two cells is electrically connected in parallel with the second string of at least two cells through the circuit board. The second string of at least two cells includes a third cell and a fourth cell, and the at least two casing structures includes a third casing structure partially enclosing the third cell with an opening towards a third corner of the circuit board, wherein the fourth corner of the circuit board is different than the second corner and the first corner. The at least two casing structures further includes a fourth casing structure partially enclosing the fourth cell with an opening towards a fourth corner of the circuit board, wherein the fourth corner of the circuit board is different than the third corner, the second corner, and the first corner.

Example 13. The device of examples 10-12 or any combination thereof, wherein the first casing structure and the second casing structure are configured to orient the first cell and the second cell at a first angle relative to a baseline. The third casing structure and the fourth casing structure are configured to orient the third cell and the fourth cell at a second angle relative to the baseline, and the first angle is offset from the second angle by at least thirty degrees.

Example 14. The device of examples 10-13 or any combination thereof, further including a bypass diode electrically connected in series with a cell of the at least two cells through the circuit board. The bypass diode is configured to allow the electrical power to flow from the string of at least two cells to the transmitter, and the bypass diode causes a voltage drop across the bypass diode of less than two hundred millivolts.

Example 15. The device of examples 10-14 or any combination thereof, further including a fuse electrically connected in series with the cell of the at least two cells through the circuit board, wherein the fuse is configured to break if an electrical current through the string of at least two cells exceeds a first threshold amplitude.

Example 16. The device of examples 10-15 or any combination thereof, wherein each casing structure of the at least two casing structures includes a metal casing structure or a ceramic casing structure.

Example 17. The device of examples 10-16 or any combination thereof, wherein the at least two casing structures includes a first casing structure and a second casing structure, wherein an opening of the first casing structure and an opening of the second casing structure are parallel and oriented in opposite directions.

Example 18. The device of examples 10-17 or any combination thereof, wherein the at least two cells includes a first cell and a second cell. The first casing structure is configured to partially enclose the first cell, wherein an opening of the first casing structure points in a first direction. The second casing structure is configured to partially enclose the second cell, wherein an opening of the second casing structure points in a second direction that is opposite of the first direction.

Example 19. The device of examples 10-18 or any combination thereof, wherein the transmitter includes an emergency position-indicating transmitter.

Example 20. A method includes including forming a circuit board and mounting at least two casing structures on the circuit board. The method also includes installing each cell of at least two cells in a respective casing structure of the at least two casing structures, such that the at least two cells are electrically connected in series or in parallel through the circuit board, and such that the respective casing structure surrounds the respective cell with an opening on one end of the cell.

Example 21. The method of example 20, wherein mounting the at least two casing structures include mounting a first casing structure to orient a first cell at a first angle on a first side of the circuit board and mounting a second casing structure to orient a second cell at a second angle on a second side of the circuit board.

Example 22. The method of examples 20-21 or any combination thereof, further including mounting a bypass diode on the circuit board such that the bypass diode is electrically connected in series with the string of at least two cells through the circuit board.

Example 23. The method of examples 20-22 or any combination thereof, wherein installing each cell of the string of at least two cells includes installing each lithium cell of a string of at least two lithium cells.

Example 24. The method of examples 20-23 or any combination thereof, further including electrically connecting a transmitter to the string of at least two cells, such that the transmitter is configured to receive electrical power from the string of at least two cells through the circuit board.

As described herein, a "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft).

Various illustrative aspects of the disclosure are described above. These and other aspects are within the scope of the following claims.

What is claimed is:

1. A high-energy-density battery pack device, the device comprising:
   a circuit board including a first face and a second face, wherein the first face of the circuit board is an opposing face to the second face of the circuit board;
   at least four casing structures mounted on the circuit board; and
   at least four cells electrically connected in series or in parallel through the circuit board,
   wherein the at least four cells include a first cell, a second cell, a third cell, and a fourth cell, wherein the first cell and the third cell are electrically connected in series as a first string of at least two cells, the device further comprises a second string of at least two cells electrically connected in series through the circuit board, the second string including the second cell and the fourth cell, and wherein the first string of at least two cells is electrically connected in parallel with the second string of at least two cells through the circuit board,
   wherein a first casing structure of the at least four casing structures is mounted on the first face of the circuit board, at least partially surrounds the first cell, and includes an opening towards a first corner of the circuit board,
   wherein a second casing structure of the at least four casing structures is mounted on the second face of the circuit board, at least partially surrounds the second cell, and includes an opening towards a second corner of the circuit board that is different than the first corner of the circuit board,
   wherein a third casing structure of the at least four casing at least partially surrounds the third cell and includes an opening towards a third corner of the circuit board,
   wherein a fourth casing structure of the at least four casing structures at least partially surrounds the fourth cell and includes an opening towards a fourth corner of the circuit board, wherein the fourth corner of the circuit board is different than the first corner of the circuit board, the second corner of the circuit board, and the third corner of the circuit board.

2. The device of claim 1,
   wherein the first casing structure and the third casing structure are mounted on the first face of the circuit board, and
   wherein the second casing structure and the fourth casing structure are mounted on the second face of the circuit board.

3. The device of claim 2,
   wherein the first casing structure and the third casing structure are at least thirty degrees away from parallel with the second casing structure and the fourth casing structure,
   wherein the first casing structure and the third casing structure are configured to orient the first cell and the third cell at a first angle relative to a baseline,
   wherein the second casing structure and the fourth casing structure are configured to orient the second cell and the fourth cell at a second angle relative to the baseline, and
   wherein the first angle is offset from the second angle by at least thirty degrees.

4. The device of claim 1, further comprising a bypass diode electrically connected in series with a cell of the at least four cells through the circuit board, wherein the bypass diode causes a voltage drop across the bypass diode of less than two hundred millivolts.

5. The device of claim 1, wherein each casing structure of the at least four casing structures includes a metal casing structure or a ceramic casing structure.

6. The device of claim 1,
   wherein each cell of the at least four cells has a cylindrical shape with a curved surface, a first flat surface, and a second flat surface, and
   wherein each respective casing structure covers the first flat surface and at least eighty percent of the curved surface of the respective cell.

7. A device comprising:
   a high-energy-density battery pack including:
      a circuit board including a first face and a second face, wherein the first face of the circuit board is opposite the second face of the circuit board;
      at least four cells electrically connected in series or in parallel through the circuit board, wherein the at least four cells include a first cell, a second cell, a third cell, and a fourth cell, wherein the first cell and the third cell are electrically connected in series as a first string of at least two cells, the device further comprises a second string of at least two cells electrically connected in series through the circuit board, the second string of at least two cells including the second cell and the fourth cell, and wherein the first string of at least two cells is electrically connected in parallel with the second string of at least two cells through the circuit board; and
      at least four casing structures, wherein the at least four casing structures include:
         a first casing structure that at least partially surrounds the first cell, is mounted on the first face of the circuit board, and includes an opening towards a first corner of the circuit board,
         a second casing structure that at least partially surrounds the second cell, is mounted on the second face of the circuit board, and includes an opening towards a second corner of the circuit board, wherein the first corner is different than the second corner, a third casing structure that at least partially surrounds the third cell, and includes an opening towards a third corner of the circuit board, and a fourth casing structure that at least partially surrounds the fourth cell and includes an opening towards a fourth corner of the circuit board, wherein the fourth corner of the circuit board is different than the first corner of the circuit board, the second corner of the circuit board, and the third corner of the circuit board; and a transmitter configured to:

receive electrical power from the at least four cells through the circuit board; and transmit electromagnetic signals based on the electrical power.

8. The device of claim 7, wherein the first casing structure and the third casing structure are at least thirty degrees away from parallel with the second casing structure and the fourth casing structure, wherein the first casing structure and the third casing structure are configured to orient the first cell and the third cell at a first angle relative to a baseline, wherein the second casing structure and the fourth casing structure are configured to orient the second cell and the fourth cell at a second angle relative to the baseline, and wherein the first angle is offset from the second angle by at least thirty degrees.

9. The device of claim 7, further comprising a bypass diode electrically connected in series with a cell of the at least four cells through the circuit board, wherein the bypass diode is configured to allow the electrical power to flow from a string of at least two cells of the at least four cells to the transmitter, and wherein the bypass diode causes a voltage drop across the bypass diode of less than two hundred millivolts.

10. The device of claim 9, further comprising a fuse electrically connected in series with the cell of the at least two cells through the circuit board, wherein the fuse is configured to break if an electrical current through the string of at least two cells exceeds a first threshold amplitude.

11. The device of claim 7, wherein the opening of the first casing structure and the opening of the third casing structure are parallel and oriented in opposite directions.

12. The device of claim 7, wherein the transmitter includes an emergency position-indicating transmitter.

* * * * *